Figure 1:
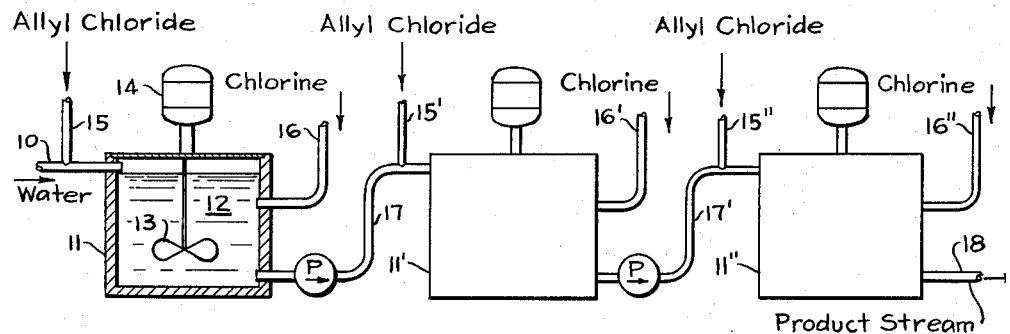

July 26, 1955   G. F. JOHNSON   2,714,123

PRODUCTION OF DICHLOROHYDRIN FROM ALLYL CHLORIDE

Filed May 31, 1951

INVENTOR:
GEORGE F. JOHNSON

BY:

HIS ATTORNEY

United States Patent Office 2,714,123
Patented July 26, 1955

2,714,123

PRODUCTION OF DICHLOROHYDRIN FROM ALLYL CHLORIDE

George F. Johnson, La Porte, Tex., assignor to Shell Development Company, Emeryville, Calif., a corporation of Delaware Application May 31, 1951, Serial No. 229,200

6 Claims. (Cl. 260—633)

This invention relates to an improved process for reacting chlorine with allyl chloride to produce dichlorohydrin. "Dichlorohydrin" is a term employed herein to designate the isomers 1,2-dichloro-3-hydroxypropane and 1,3-dichloro-2-hydroxypropane.

In its more general aspects, this invention relates to a step employed in one of the methods by which glycerine may be synthesized from allyl chloride. In one such method, allyl chloride is chlorinated to trichloropropane which is then hydrolyzed, though with difficulty, to glycerine. A second process involves the hydrolysis of allyl chloride to allyl alcohol, followed by chlorohydrination of the alcohol to monochlorohydrin which is then hydrolyzed to glycerine. This is a relatively straightforward and easy process since the allyl alcohol formed during the reaction is readily soluble in water and can be converted in high yield to the corresponding monochlorohydrin intermediate.

The present invention is concerned with still a third process for synthesizing glycerine. In this process allyl chloride is directly chlorohydrinated to dichlorohydrin, and the latter compound is then hydrolyzed to glycerine. The overall reactions involved in forming the dichlorohydrin are:

(1) $H_2O + Cl_2 \longrightarrow HOCl + HCl$ (2)
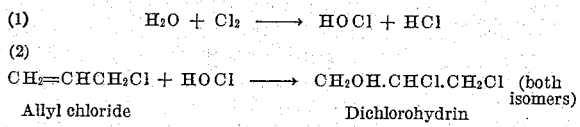
Allyl chloride           Dichlorohydrin (both isomers)

Unfortunately, the foregoing reactions are accompanied by undesirable side reactions which normally consume from about 10 to 25% or more of the reactants, the principal side reactions being:

(3)    $CH_2=CHCH_2Cl + Cl_2 \longrightarrow CH_2Cl.CHCl.CH_2Cl$ and (4)
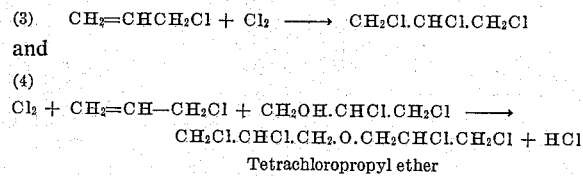
Tetrachloropropyl ether These side reactions take place in both the aqueous phase of the system as well as in the organic phase thereof made up of the substantially water-insoluble trichloropropane and tetrachloropropyl ether by-products together with any undissolved allyl chloride which may be present, the latter compound being soluble to the extent of but 0.36% in water at 20° C. Approximately 5 to 15% of the allyl chloride is normally lost in aqueous phase by-product reactions, whereas the organic phase losses have ranged from about 5 to 20%, depending on the nature of the particular process employed. These losses are especially severe as the aqueous reaction solutions become relatively concentrated.

The efforts heretofore made to decrease by-product formation have been primarily directed to reducing that portion thereof which occurs in the organic phase, it having been considered that aqueous phase by-product formation could not be reduced to any appreciable extent under practical operating conditions. Processes for producing dichlorohydrin are normally conducted in a continuous manner with make-up water and fresh quantities of the allyl chloride and chlorine reactants being continuously added to the system as a product stream containing the dichlorohydrin reaction product is continuously withdrawn therefrom. In operations such as this, it is known that organic phase by-product losses can be reduced by maintaining that portion of the reaction mixture containing unreacted allyl chloride and chlorine as free as possible of any organic phase, and the practice has been to employ a recirculating system wherein the effluent from the reaction chamber is led into a settling tank from which the organic phase is drawn off as bottoms before the supernatent aqueous layer (from which a product stream is continuously withdrawn) is provided with additional quantities of the reactants and make-up water and then recycled back to the reaction chamber. Further, the practice has been to add caustic to the reaction mixture so as to reduce the amount of free chlorine which is present in the solution, it having been observed that such chlorine tends to dissolve preferentially in the non-aqueous phase and thereby accentuate by-product formation.

Still another method for decreasing organic phase by-product losses, wherein the organic phase is maintained in a highly dispersed condition in at least that portion of the system wherein reaction between allyl chloride and chlorine occurs, is described and claimed in copending application Serial No. 228,216, filed May 25, 1951. However, none of these methods is effective to reduce by-product losses occurring in the aqueous phase of the system, and it would be desirable if a method were available which could be practiced either with the aforesaid methods, or independently thereof, whereby these aqueous phase losses could be substantially reduced without in any way reducing the efficiency of the operation.

It is my discovery that when allyl chloride is reacted with chlorine in aqueous solution to produce dichlorohydrin, by-product losses occurring as a result of aqueous phase reactions can be reduced by approximately 20 to 50% by adding the allyl chloride and chlorine to the aqueous reaction solution in a series of increments, the overall chlorohydrination reaction thereby taking place in a series of stages at progressively increasing concentrations of the dichlorohydrin reaction product, and at an average dilution which is greater than exists in conventional processes, as of the type described above, where the dilution of the aqueous reaction mixture remains relatively constant and is governed directly by the relative rates at which make-up water and allyl chloride are added to the mixture. This can be accomplished by introducing the total amount of water to be used, or at least a large proportion thereof, into a first reaction zone together with a fraction of the total amounts of the respective allyl chloride and chlorine reactants which will ultimately be added to the aqueous reaction mixture. The reaction mixture from this first reaction zone is then passed to second and possibly succeeding reaction zones in each of which additional quantities of allyl chloride and chlorine (but substantially no, or only small amounts of water) are added, the reaction mixture reaching its highest and final concentration only in the final reaction zone. By using just two such reaction zones, with all the water and but 50% of the respective allyl chloride and chlorine reactants being introduced into the first zone, and with the balance of the reactants being added in the second reaction zone, it is possible to reduce aqueous phase by-product formation by as much as 20 to 25%. As the number of reaction zones is increased to three, the reduction in said by-product losses is increased to about 30 to 33%, while by still further increasing the number of reaction zones employed, aqueous phase by-product losses can be reduced by amounts approaching 50%. Thus, in conventional systems of the type wherein a single reaction zone is employed, with allyl chloride being continuously added in the proportion of one volume for each 25 volumes of make-up water, aqueous phase by-product losses can be reduced from a value of 7.5 to 8% to one of but 5.5 to 6% by conducting the operation in two stages (i. e., by utilizing two reaction zones), and to ones of approximately 5% and 4.5% by the respective use of three and four stages of operation. In each case it should be noted that there is no difference between the dilution of the mixture discharged from the final stage (or reaction zone) and that obtained by the conventional one-stage process, each containing approximately 6 to 6.5% by weight of dichlorohydrin. This reduction becomes quantitatively even greater in the case of more concentrated solutions. Thus, aqueous phase by-product losses of 14% experienced in single-stage operations using a 12/1 ratio of make-up water to allyl chloride are reduced to 10.5% by a 2-stage operation, to 9.4% by a 3-stage operation, to 8.8% in a 4-stage operation and to 8.5% by a 5-stage operation. These values assume that equal volumes of the allyl chloride and chlorine reactants are added in the respective stages and that substantially all of the water is added in the first stage. Should additional quantities of water be added in stages subsequent to the first, these reductions will be correspondingly reduced.

Figure 2:
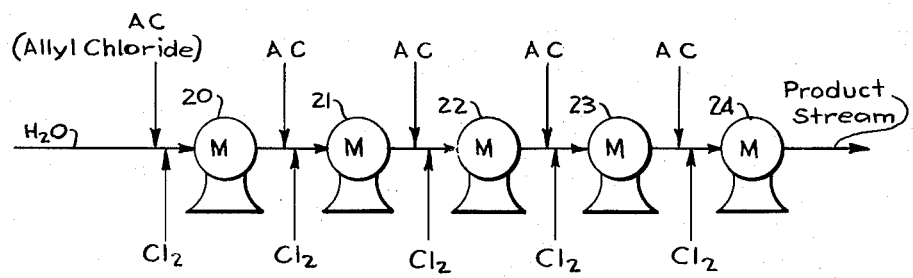
Figure 3:
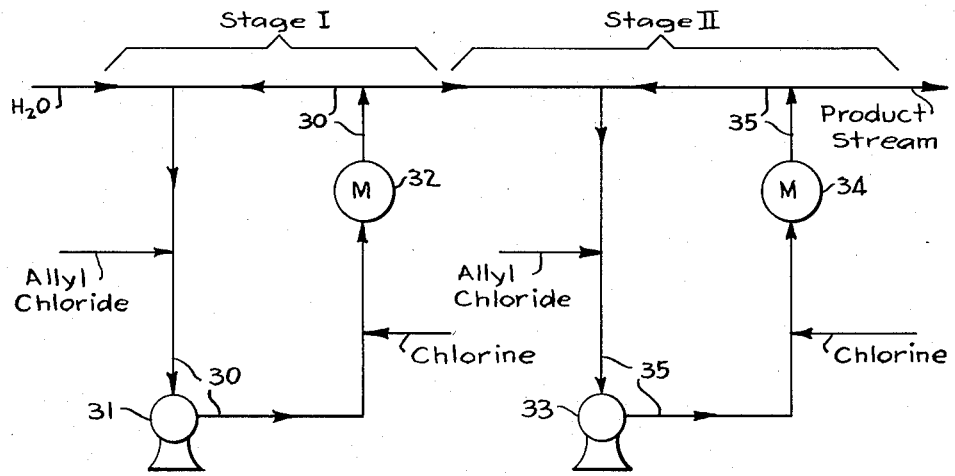

Systems suitable for practicing the present invention are illustrated in Figs. 1, 2 and 3 of the drawing. In the unit shown in Fig. 1, a fresh water stream is continuously introduced through conduit 10 into a first reactor 11 containing relatively dilute reaction mixture 12, said reactor being provided with a stirrer 13 and driven by the motor 14. Allyl chloride is continuously fed into the water stream through conduit 15 while chlorine, in an amount substantially equimolar with respect to the allyl chloride, is fed to the reactor through conduit 16. The reaction mixture 12 is continuously withdrawn from the reactor 11 at a rate sufficient to maintain a constant liquid level therein and is pumped through conduit 17 into a second reactor 11' to which additional amounts of allyl chloride and chlorine are supplied through conduits 15' and 16', respectively. From the reactor 11' the now more concentrated aqueous reaction mixture is pumped through conduit 17' into a third reactor 11'' to which the final additions of allyl chloride and chlorine are made through conduits 15'' and 16''. The final product stream is withdrawn from reactor 11'' through conduit 18 and is sent to product recovery. The reactors 11' and 11'' are provided with stirrers (not shown) and are similar in construction to reactor 11.

In the system illustrated, somewhat schematically, in Fig. 2 of the drawing, fresh water is continuously supplied to a motor driven mixer 20 along with allyl chloride and chlorine, the reaction between allyl chloride and chlorine in the majority of cases being substantially completed by the time the reaction liquid leaves the mixer. The reaction mixture is now fed to a second motor driven mixer 21 along with additional amounts of allyl chloride and chlorine, with succeeding additions of the reactants being made as the mixture passes progressively through mixers 22, 23 and 24. By the time the reaction mixture is discharged from the mixer 24, the desired concentration of dichlorohydrin therein has been reached and the mixture is ready for the next processing step.

In the system which is schematically illustrated in Fig. 3 of the drawing, there are coupled together two reaction zones, designated stage I and stage II, respectively, in each of which a reaction mixture of given concentration is continuously recirculated. In stage I make-up water, allyl chloride and chlorine are continuously introduced, as indicated, into the reaction mixture which is being recirculated in line 30. A portion of the mixture in line 30, after passing through pump 31 and mixer 32, is continuously diverted to stage II, where, along with further quantities of allyl chloride and chlorine which are being continuously added, it forms the make-up liquid added to the reaction mixture which is being recirculated through pump 33 and mixer 34 in line 35. A portion of the stream in line 35, which is more concentrated than that in line 30, is continuously discharged as product.

In any of the systems illustrated in the drawing, additional reaction zones could be supplied, as desired, without changing the principle of the operation, their use serving but to further decrease the aqueous phase by-product losses. Further, minor amounts of water in addition to that initially supplied to the first reaction zone could be supplied to one or more of the subsequently encountered reaction zones without departing from the principle of the invention, though it is preferred that substantially all of the water be added to the first reaction zone since this represents the most efficient method for practicing the invention.

The final concentration of the aqueous reaction mixture obtained by a practice of the present invention may be varied within relatively wide limits. However, it is preferred that a total of from 0.02 to 0.1 volume of allyl chloride (and a substantially equimolar quantity of chlorine) be added for each volume of water supplied the system. At dilutions greater than this the costs of handling the water in the stream become unduly high, whereas with the addition of amounts of allyl chloride exceeding 0.1 volume per volume of water, the aqueous phase by-product losses become too large for practical operation even considering the reduction in said losses effected by the practice of this invention.

Once the general method of operation has been selected and the reactant and water flow rates established, the other conditions of the reaction may be varied within relatively wide limits. Thus, the allyl chloride and chlorine may be supplied in either the gaseous or liquid condition, gaseous addition of the allyl chloride being particularly effective in systems of the type illustrated in Fig. 1 of the drawing where agitation of the mixture may be insufficient to maintain the organic phase present in the mixture in a finely dispersed condition. The reaction may be conducted within a wide temperature range and under atmospheric, subatmospheric, or superatmospheric pressures. In general, reaction temperatures between 10 and 90° C. can be employed. The reaction is somewhat exothermic in nature, and good results are obtained in most cases by permitting the system to come to equilibrium at a temperature between about 25 and 75° C. As noted above, the reaction between allyl chloride and chlorine proceeds rapidly to conclusion and is normally complete in periods of but one or two seconds, or less, though extension of the reaction period is without harmful result from the standpoint of product yield. Total residence times (determined by dividing the total volume of the system by the rate of product drawoff per minute) of from 1 to 10 minutes are preferred, though good results have been obtained with even shorter residence times. The residence times may be extended beyond 10 minutes without deleterious effect from the product standpoint, though equipment and operating costs may be somewhat increased as a result of such extension.

Caustic may or may not be added to the aqueous reaction mixture as desired. When no caustic is added the product stream normally has a pH of from about 0.3 to 1. Should this pH so so low as to engender corrosion difficulties, the pH may be adjusted upwardly, as to value of from about 2.5 to 6, by the addition of caustic without causing any harmful effects other than reduction of the reaction rate, and with some benefit from the standpoint of reduction in organic phase by-product losses.

The invention is illustrated by the following examples:

*Example I*

In this operation there was employed a system of the type illustrated in Fig. 3 of the drawing. Each of the respective reaction stages employed had an internal capacity of 247 volumes, and this amount of aqueous reaction mixture, at temperatures between 48 and 53° C., was circulated in each of the stages at a rate of 2700 volumes per minute. In stage I, make-up water and allyl chloride were added at rates of 1.24 and 3.45 volumes per minute, respectively, with chlorine being added in an amount substantially equimolar with respect to the allyl chloride. This rate of addition of chlorine and allyl chloride was maintained at substantially the same level in stage II of the system, though in this stage no fresh make-up water was added. The aqueous reaction mixture had a residence time of approximately 2 minutes in each of the stages, or a total residence time of about 4 minutes, this being determined by dividing the capacity of the stage by the rate of product drawoff per minute. By analysis of the product stream withdrawn from stage II it was found that approximately 91.6% of the entire amount of allyl chloride charged to the system had been converted to dichlorohydrin, whereas the balance was lost to by-products.

The foregoing operation is then repeated, but with the use of only stage I, and with the rates of allyl chloride and chlorine addition being twice as great as in the case of the individual stages described in the preceding paragraph. It is now found that by-product formation increases by approximately 83% over that encountered by the use of 2 reaction stages, the yield of dichlorohydrin being here reduced to approximately 84.6% with 15.4% of the allyl chloride being lost in the form of trichloropropane and tetrachloropropyl ether by-products.

*Example II*

The operations described in the first paragraph of Example I above were repeated using 3 instead of 2 reaction stages, the other conditions of operation remaining the same. Thus, in this 3-stage operation the reaction solution reached a terminal dilution of approximately 11.9 (determined by dividing the volumes of water added by the total number of volumes of allyl chloride added) as contrasted with a terminal dilution of approximately 17.7 in the case of the 2-stage operation described above. Despite the use of this abnormally low terminal dilution, it was found that approximately 85.8% of the allyl chloride was converted to dichlorohydrin. On the other hand, when the reaction was conducted in but a single stage (again with a terminal dilution of 11.9) the dichlorohydrin yield was reduced to approximately 74%. In both of the operations described in this example, a considerable portion of the by-products was formed in the organic phase of the system. However, it is believed that aqueous phase by-product reactions accounted for approximately 14% of the allyl chloride fed to the system in the case of the single-stage operation, and only 9.3% in the case of the 3-stage system.

The invention claimed is:

1. In a continuous process for producing an aqueous solution of dichlorohydrin, the method of reducing by-product losses in the reaction which comprises reacting allyl chloride, water and chlorine in a plurality of reaction zones in series in which reacted mixture is withdrawn from each zone and fed to the succeeding zone in the series, continuously feeding substantially all of said water into the first of said reaction zones, continuously feeding into each of the several reaction zones allyl chloride and chlorine in substantially equimolar proportions and withdrawing aqueous dichlorohydrin solution as product from the last of said reaction zones whereby the reaction is carried out at a higher average dilution.

2. The process of claim 1 wherein a total of one volume of allyl chloride is added for each 10 to 50 volumes of water supplied to the system.

3. The method of claim 1 wherein the reaction in each stage is effected in a circulating stream of reaction mixture into which the allyl chloride and chlorine are fed in equimolar proportions.

4. In a continuous process for producing an aqueous solution of dichlorohydrin by reacting together allyl chloride, water and chlorine in a plurality of reaction zones in series in which reacted mixture is withdrawn from each zone and fed to the succeeding zone in the series, the method of reducing by-product losses in the reaction which comprises continuously feeding substantially all of said water into the first of said reaction zones, feeding continuously into each of the several reaction zones allyl chloride and chlorine in substantially equimolar proportions and withdrawing aqueous dichlorohydrin solution from the last of said reaction zones, about equal volumes of allyl chloride and chlorine being added in each of said reaction zones whereby the reaction is carried out at a higher average dilution.

5. The method of claim 4 wherein a minor amount of water is added in at least one of the later reaction zones.

6. The method of claim 4 wherein a total of 1 volume of allyl chloride is added for each 10 to 50 volumes of make-up water supplied the system.

References Cited in the file of this patent

UNITED STATES PATENTS

| 1,496,675 | Irvine et al. | June 3, 1924 |
| 2,007,168 | Kautter | July 9, 1935 |